United States Patent
Gu et al.

(10) Patent No.: US 11,537,238 B2
(45) Date of Patent: Dec. 27, 2022

(54) TOUCH CONTROL IDENTIFICATION METHOD, DEVICE AND SYSTEM

(71) Applicant: GOERTEK INC., Shandong (CN)

(72) Inventors: Quanyong Gu, Shandong (CN); Zhuocheng Li, Shandong (CN)

(73) Assignee: GOERTEK INC., Shandong (CN)

( * ) Notice: Subject to any disclaimer, the term of this patent is extended or adjusted under 35 U.S.C. 154(b) by 55 days.

(21) Appl. No.: 15/733,374

(22) PCT Filed: Nov. 30, 2018

(86) PCT No.: PCT/CN2018/118537
§ 371 (c)(1),
(2) Date: Jul. 15, 2020

(87) PCT Pub. No.: WO2019/148956
PCT Pub. Date: Aug. 8, 2019

(65) Prior Publication Data
US 2020/0341613 A1    Oct. 29, 2020

(30) Foreign Application Priority Data
Jan. 31, 2018 (CN) .......................... 201810098353.8

(51) Int. Cl.
*G06F 3/041* (2006.01)
(52) U.S. Cl.
CPC ................ *G06F 3/04186* (2019.05)

(58) Field of Classification Search
CPC ............. G06F 3/04186; G06F 3/04883; G06F 3/0416; G06F 3/0488
See application file for complete search history.

(56) References Cited

U.S. PATENT DOCUMENTS

| 6,323,846 B1* | 11/2001 | Westerman | G06F 3/04186 |
| | | | 345/173 |
| 2006/0197753 A1* | 9/2006 | Hotelling | G06F 1/169 |
| | | | 345/173 |
| 2007/0229466 A1* | 10/2007 | Peng | G06F 3/04883 |
| | | | 345/173 |

(Continued)

FOREIGN PATENT DOCUMENTS

| CN | 102117166 A | 7/2011 |
| CN | 102736757 A | 10/2012 |

(Continued)

*Primary Examiner* — Carolyn R Edwards
(74) *Attorney, Agent, or Firm* — LKGlobal | Lorenz & Kopf, LLP

(57) ABSTRACT

A method, device and system for touch recognition are disclosed. The method includes: acquiring touch information corresponding to a first touched position on a touched surface when a touch operation is performed at the first touched position; acquiring a continuous-touch condition of the first touched position according to the touch information corresponding to the first touched position; and updating a corresponding touch-operation identifier according to the continuous-touch condition of the first touched position to recognize the touch operation, and performing a touch response to a corresponding touch operation according to the touch-operation identifier as updated.

15 Claims, 2 Drawing Sheets

Acquiring touch information corresponding to a first touched position on a touched surface when a touch operation is performed at the first touched position — S110

Acquiring a continuous-touch condition of the first touched position according to the touch information corresponding to the first touched position — S120

Updating a corresponding touch-operation identifier according to the continuous-touch condition of the first touched position to recognize the touch operation, and performing a touch response to a corresponding touch operation according to the touch-operation identifier as updated — S130

(56) References Cited

U.S. PATENT DOCUMENTS

| | | | |
|---|---|---|---|
| 2007/0291009 A1* | 12/2007 | Wright | G06F 3/04855 |
| | | | 345/173 |
| 2008/0165140 A1* | 7/2008 | Christie | G06F 3/04883 |
| | | | 345/173 |
| 2011/0171998 A1 | 7/2011 | Westerman | |
| 2012/0249448 A1* | 10/2012 | Liu | G06F 3/04883 |
| | | | 345/173 |
| 2012/0306793 A1* | 12/2012 | Liu | G06F 3/04883 |
| | | | 345/173 |

FOREIGN PATENT DOCUMENTS

| | | |
|---|---|---|
| CN | 103513882 A | 1/2014 |
| CN | 103620542 A | 3/2014 |
| CN | 108399042 A | 8/2018 |
| TW | 201214211 A | 4/2012 |
| WO | 2008157239 A3 | 12/2009 |

\* cited by examiner

TOUCH CONTROL IDENTIFICATION METHOD, DEVICE AND SYSTEM

CROSS REFERENCE TO RELATED APPLICATIONS

This application is a U.S. National Stage entry under 35 U.S.C. § 371 based on International Application No. PCT/CN2018/118537, filed on Nov. 30, 2018, which claims priority to Chinese Patent Application No. 201810098353.8, filed on Jan. 31, 2018. These priority applications are hereby incorporated herein in their entirety by reference.

TECHNICAL FIELD

This Application pertains to a method, device and system for touch recognition.

BACKGROUND

Touch has become a standard way of human-machine interaction and has been widely used in technical fields such as smart terminals. For example, users can easily and quickly perform various operations on the terminal through the touch screen. At present, when a terminal is controlled by touch, recognition errors or misrecognitions often occur in performing operations such as single click, double click, long press, and forward or backward-slide operations. For example, traditional algorithms for interaction between a touch sensor and a user usually adopt the type of judgment in which sensor data are read in real time and the touch operation is waited for or delayed. If the user touches the boundary between two touched positions, the numerical value collected by the touch sensor will keep changing between the two touched positions, which may cause misjudgment and affect the user experience. In addition, other objects, desirable features and characteristics will become apparent from the subsequent summary and detailed description, and the appended claims, taken in conjunction with the accompanying drawings and this background.

SUMMARY

An aspect of the present disclosure provides a method for touch recognition, comprising:
acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;
acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and
updating a corresponding touch-operation identifier according to the continuous-touch condition of the first touched position to recognize the touch operation, and performing a touch response to a corresponding touch operation according to the touch-operation identifier as updated.

Another aspect of the present disclosure provides a device for touch recognition, comprising:
a first acquiring module, for acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;
a second acquiring module, for acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and
a recognizing module, for updating a corresponding touch-operation identifier according to the continuous-touch condition of the first touched position to recognize the touch operation, and performing a touch response to a corresponding touch operation according to the touch-operation identifier as updated.

Still another aspect of the present disclosure provides a system for touch recognition, comprising:
one or more storage units for storing executable instructions; and
one or more processing units for executing the executable instructions to implement the method for touch recognition described above.

Further still another aspect of the present disclosure provides a computer-readable storage medium storing executable instructions, wherein when the executable instructions are executed by a processor, the method for touch recognition described above can be implemented.

The present disclosure acquires the continuous-touch condition of the first touched position based on the change of the touched position and the change of the touch duration on the touched surface, updates the corresponding touch-operation identifier by using the continuous-touch condition of the first touched position, and recognizes the touch operation on the touched surface by using the correspondence between the numerical value of the touch-operation identifier and the touch operation.

The present disclosure can recognize touch operations containing interference operations in the touch process caused by factors such as touching the boundary of adjacent touched positions, and back and forth sliding touch between adjacent touched positions. The examples of touch operations containing interference operations include: a long-press operation containing a slide operation, a slide operation or long-press operation containing a single-click or double-click operation, and a forward-slide operation containing a backward-slide operation. The present disclosure aims to solve those problems, and can effectively avoid the influence of interference operations, accurately recognize various touch operations of the user on the touched surface, and enhance the user experience.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, technical solutions and advantages of the present disclosure clearer, the embodiments of the present disclosure will be described in further detail with reference to the accompanying drawings.

In an actual electronic device, different touched positions may have different position responses, so that the touched position or touch distance can reflect directions of touch operations. Therefore, touch response devices may be provided at different positions under the touched surface to respond to touch actions at different positions. However, touch operations containing interference operations in the touch process, caused by factors such as touching the boundary of adjacent touched positions and back and forth sliding touch between adjacent touched positions, often result in misrecognition of the touch operations. For example, the following cases of misrecognition may occur:

Misrecognition case 1: the user actually intends a long-press operation, but the accidental sliding during the long-press process (for example, the user intends to perform a long-press operation by long press of the first touched position of the touched surface, but accidentally slide from the first touched position to the second touched position during the long-press process) causes a problem that a long-press operation and a slide operation coexist.

Misrecognition case 2: the user actually intends a slide operation, but due to the large physical distance between two adjacent touched positions, the sensor cannot detect the touch between adjacent touched positions, and it appears during the sliding process that "no touched position is touched". In other words, there is an invalid contact that cannot be ignored during the sliding process, which results in the coexistence of the slide operation and the single-click or double-click operation.

Misrecognition case 3: the user actually intends a forward-slide operation, but because it is not convenient to slide clockwise at the first touched position, the user will firstly slide counterclockwise to a convenient position and then perform the forward-slide operation, which results in the coexistence of the forward-slide operation and the backward-slide operation.

In view of the above problems, an aspect of the present disclosure provides a method for touch recognition.

Figure 1:
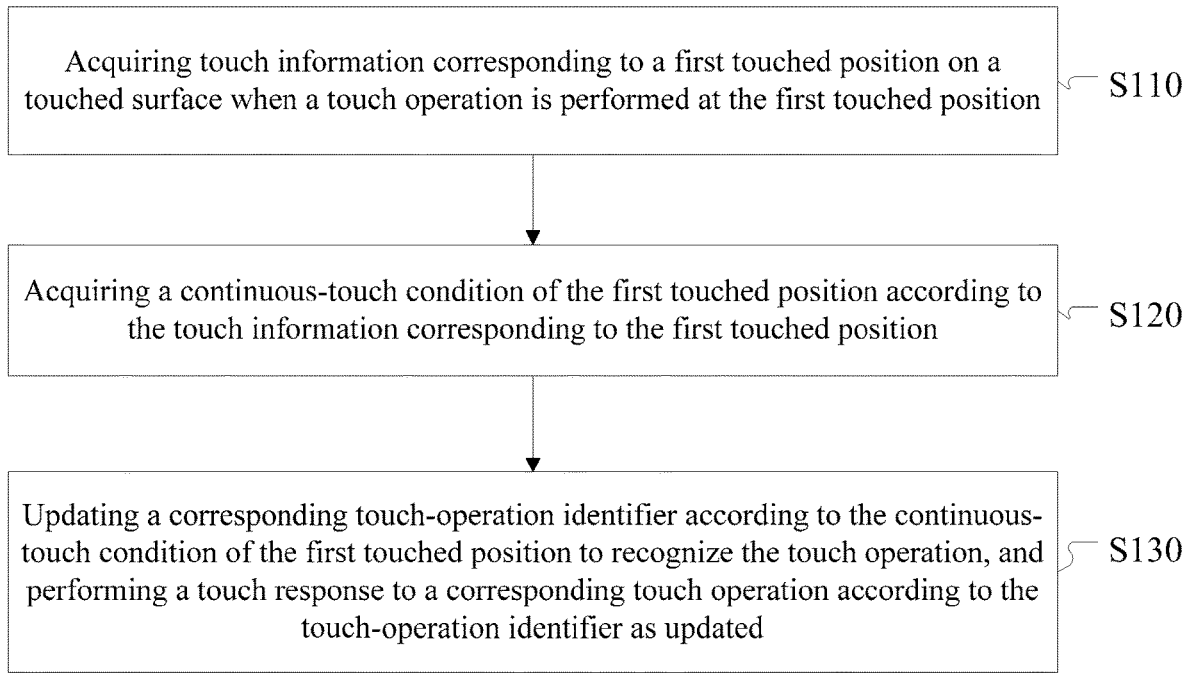
FIG. 1 is a flowchart of a method for touch recognition according to an embodiment of the present disclosure.

FIG. 1 is a flowchart of a method for touch recognition according to an embodiment of the present disclosure. As shown in FIG. 1, the method according to the present embodiment comprises:

S110: acquiring touch information corresponding to a first touched position on a touched surface when a touch operation is performed at the first touched position. The touch information includes a touched-position identifier, a touch duration, and a touch-operation identifier.

In the present embodiment, the touched-position identifier is used to identify the position of the touched surface, the touch duration is used to identify the time period when the touch operation is performed at a position on the touched surface, and the touch-operation identifier is used to identify the type of touch operation. For example, the touch-operation identifier includes a long-press identifier, a single-click identifier, a double-click identifier, and a slide identifier. In the present embodiment, the touch-operation identifier corresponding to the first touched position acquired is an initial value of each touch-operation identifier. In the present embodiment, the touch operation is recognized based on the numerical value of the touch-operation identifier.

Figure 2:
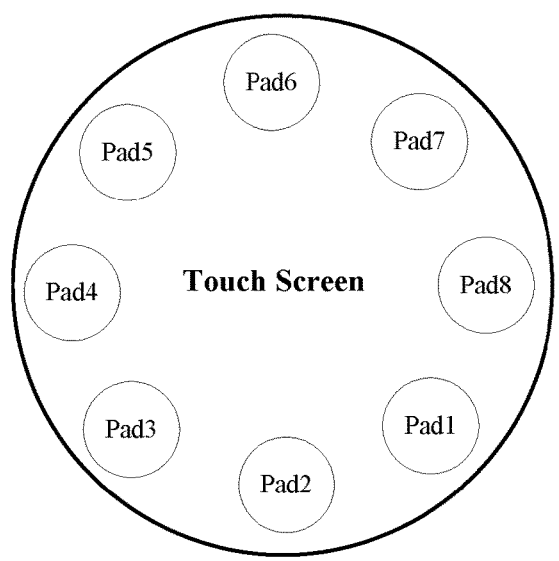
FIG. 2 is a schematic diagram of pad distribution of a touch screen according to an embodiment of the present disclosure.

In some embodiments of the present disclosure, the touched surface may be a touch screen, which is mainly applied to mobile-terminal electronic products such as headphones and portable speakers. The position of the touched surface may be defined according to the sensor of the touched surface, and the touched-position identifier may be used to uniquely identify a corresponding position. The touched surface comprises a plurality of touched positions. In the following description of the present disclosure, each touched position is recorded as a pad, and the plurality of pads are distributed on the touch screen in a preset manner. Correspondingly, the touched-position identifier may be a pad number. As shown in FIG. 2, the plurality of pads are distributed on the touch screen in a ring shape. The order of pad1, pad2, pad3, pad8 may be defined as a forward direction; that is, when the touched positions of the touch operation are touched in this order (pad numbers from small to large), it can be regarded as a forward touch. Conversely, when the touched positions of the touch operation are touched in the opposite order to this order (pad numbers from large to small), it can be regarded as a backward touch. The touched-position information is acquired by reading the number of the touched pad from the touch-sensor module by using interactive means such as an i2c bus.

S120: acquiring a continuous-touch condition of the first touched position according to the touch information corresponding to the first touched position.

The continuous-touch condition of the first touched position includes:

a first continuous-touch condition in which a second touched position adjacent to the first touched position is continuously touched (referring to the above embodiment regarding the forward direction and the backward direction, the adjacent touched positions according to the present embodiment may be understood as forwardly adjacent or backwardly adjacent);

a second continuous-touch condition in which the touch duration of the first touched position is greater than a preset first touch duration (for example, the preset first touch duration is 30 ms, and the continuous touch duration of the first touched position on the touched surface is greater than 30 ms); and a third continuous-touch condition in which there is no other touched position on the touched surface that is continuously touched after the first touched position is touched.

In the above, that "there is no other touched position on the touched surface that is continuously touched after the first touched position is touched" may be understood as that, after the first touched position is touched, the touch operation leaves the touched surface for a certain period of time, and then the second touched position on the touched surface adjacent to the first touched position is touched; or, after the first touched position is touched, the touch operation leaves the touched surface for a certain period of time, and then no other touched position on the touched surface is touched. That is, in the present embodiment, the third continuous-touch condition includes: a condition in which after the first touched position is touched, there is no other touched position on the touched surface that is continuously touched within a preset second touch duration, and a condition in which after the first touched position is touched, a second touched position adjacent to the first touched position on the touched surface is touched within a preset second touch duration.

In practical use, if after the first touched position is touched, another position on the touched surface that is not adjacent to the first touched position is touched, at this point, the touch operation is recognized as a misoperation, and in the present embodiment, the touch response to the touch operation is not performed.

S130: updating a corresponding touch-operation identifier according to the continuous-touch condition of the first touched position to recognize the touch operation, and performing a touch response to a corresponding touch operation according to the touch-operation identifier as updated.

In the present embodiment, all of the touch-operation identifiers are acquired in step S110. The touch-operation identifiers acquired at this point are initial values, and the corresponding touch-operation identifiers are updated according to the continuous-touch condition of the first touched position. For example, when the continuous-touch condition of the first touched position is the second continuous-touch condition, the long-press identifier is updated by updating the initial value of the long-press identifier to the first numerical value. The touch operation can be recognized as a long-press operation according to the long-press identifier as updated, to perform a touch response to the long-press operation.

The present embodiment acquires the continuous-touch condition of the first touched position based on the change of the touched position and the change of the touch duration on the touched surface, updates the corresponding touch-operation identifier by using the continuous-touch condition of the first touched position, and recognizes the touch operation on the touched surface by using the correspondence between the numerical value of the touch-operation identifier and the touch operation.

The present disclosure can recognize touch operations containing interference operations in the touch process caused by factors such as touching the boundary of adjacent touched positions, and back and forth sliding touch between adjacent touched positions. The examples of touch operations containing interference operations include: a long-press operation containing a slide operation, a slide operation or long-press operation containing a single-click or double-click operation, and a forward-slide operation containing a backward-slide operation. The present disclosure aims to solve those problems, and can effectively avoid the influence of interference operations, accurately recognize various touch operations of the user on the touched surface, and enhance the user experience.

Since in the present embodiment, each touched position can respond to touch operations such as single click, double click, long press, and slide, there is no need to specify a certain position for a specific type of touch operation. Therefore, the method according to the present embodiment may also be applied to touch operations in an invisible state.

In some embodiments of the present disclosure, the slide identifier includes a forward-slide identifier and a backward-slide identifier. At this point, the first continuous-touch condition according to the present embodiment includes: a condition in which a second touched position forwardly adjacent to the first touched position is continuously touched; and a condition in which a second touched position backwardly adjacent to the first touched position is continuously touched. The forward-slide operation and the backward-slide operation are relative touch operations. In the present embodiment, being forwardly adjacent and being backwardly adjacent are defined based on how the positions on the touched surface are defined.

For example, regarding the pad distribution shown in FIG. 2, relative to pad1, pad2 is forwardly adjacent to pad1. If the touch operation is to slide from the position of pad1 to the position of pad2 on the touched surface, the forward-slide identifier is updated. Conversely, relative to pad2, pad1 is backwardly adjacent to pad2. If the touch operation is to slide from the position of pad2 to the position of pad1 on the touched surface, the backward-slide identifier is updated. When the pads are distributed in other forms (for example, in a row or in a column), the forward-slide identifier may be updated when the touch pad is slidden rightwardly (or upwardly) on the touched surface, and the backward-slide identifier may be updated when the touch pad is slidden leftwardly (or downwardly) on the touched surface.

When the continuous-touch condition of the first touched position is the first continuous-touch condition, the method for recognizing the touch operation will be described below by taking the following case as an example: the first continuous-touch condition is the condition in which a second touched position forwardly adjacent to the first touched position is continuously touched. Obviously, the method for recognizing the touch operation when the first continuous-touch condition is the condition in which a second touched position backwardly adjacent to the first touched position is continuously touched is the same as that when the first continuous-touch condition is the condition in which a second touched position forwardly adjacent to the first touched position is continuously touched.

When the second touched position forwardly adjacent to the first touched position is continuously touched, the forward-slide identifier is updated, and touch information corresponding to the second touched position when the touch operation is performed at the second touched position on the touched surface is acquired. At this point, the forward-slide identifier is updated from the initial value to the first numerical value. Assuming that the initial value is 0, the first numerical value is 1, and the second numerical value is 2.

In the present embodiment, after acquiring the touch information corresponding to the second touched position, the continuous-touch condition of the second touched position is acquired according to the touch information corresponding to the second touched position, and according to the continuous-touch condition of the second touched position, the corresponding touch-operation identifier is updated.

The continuous-touch condition of the second touched position includes four cases, namely, (1) a condition in which a third touched position forwardly adjacent to the second touched position is continuously touched, (2) a condition in which a fourth touched position backwardly adjacent to the second touched position is continuously touched, (3) a condition in which a sum of a touch duration of the second touched position and a touch duration of the first touched position is greater than a preset first touch duration, and (4) a condition in which there is not a touched position on the touched surface that is continuously touched after the second touched position is touched.

The methods for updating the touch-operation identifiers corresponding to each case of the continuous-touch condition of the second touched position are as follows.

(1) When a third touched position forwardly adjacent to the second touched position is continuously touched, the forward-slide identifier is re-updated. For example, the forward-slide identifier is updated from the first numerical value to the second numerical value; namely, the numerical value of the forward-slide identifier is updated from 1 to 2. For example, the second numerical value of the forward-slide identifier corresponds to the forward-slide operation. At this point, the touch operation is recognized as a forward-slide operation according to the forward-slide identifier as re-updated, and the touch response to the forward-slide operation is performed according to the forward-slide identifier.

Taking the touched positions of the touched surface as shown in FIG. 2 as an example, if the first touched position is pad1, and pad2 is continuously touched, the forward-slide identifier is updated to 1. If after pad2 is continuously touched, pad3 is also continuously touched, the forward-slide identifier is updated to 2. At this point, the touch operation is recognized as a forward-slide operation.

In the present embodiment, when the continuous-touch condition of the first touched position is that the second touched position forwardly adjacent to the first touched position is continuously touched and the third touched position forwardly adjacent to the second touched position is continuously touched (namely, when the touch operation slides from the first touched position to the second touched position on the touched surface, and then slides to the third touched position), the touch operation is recognized as a forward-slide operation, and the touch operation is not immediately recognized as a forward-slide operation when the touch operation slides from the first touched position to the second touched position. When the touch operation corresponding to the first touched position is a misoperation, and the operation corresponding to the second touched position is a user-intended operation (for example, the user intends to perform a touch operation such as a long press or a single click), the method for recognizing a forward-slide operation according to the present embodiment can avoid erroneously recognizing a touch operation such as a long press or a single click as a forward-slide operation.

(2) When a fourth touched position backwardly adjacent to the second touched position is continuously touched, the backward-slide identifier is updated. For example, the backward-slide identifier is updated from the initial value to the first numerical value; namely, the numerical value of the backward-slide identifier is updated from 0 to 1. At the same time of updating the backward-slide identifier, touch information corresponding to the fourth touched position when the touch operation is performed at the fourth touched position on the touched surface is acquired, and the continuous-touch condition of the fourth touched position is acquired according to the touch information corresponding to the fourth touched position, so as to update the corresponding touch-operation identifier according to the continuous-touch condition of the fourth touched position.

Taking the touched positions of the touched surface as shown in FIG. 2 as an example, if the first touched position is pad1, when pad2 is continuously touched, the forward-slide identifier is updated to 1. If after pad2 is continuously touched, pad1 is continuously touched again, the backward-slide identifier is updated to 1. At this point, the continuous-touch condition of pad1 is acquired, and the touch-operation identifier is updated according to the continuous-touch condition of pad1.

The continuous-touch condition of the fourth touched position includes: a condition in which a fifth touched position forwardly adjacent to the fourth touched position is continuously touched, or a condition in which a sixth touched position backwardly adjacent to the fourth touched position is continuously touched, or a condition in which a sum of a touch duration of the fourth touched position and a touch duration of the second touched position and a touch duration of the first touched position is greater than a preset first touch duration, or a condition in which there is no other touched position on the touched surface that is continuously touched after the fourth touched position is touched.

Regarding the process of updating the corresponding touch-operation identifier according to the continuous-touch condition of the fourth touched position, it may refer to the process of updating the corresponding touch-operation identifier according to the continuous-touch condition of the second touched position, which will not be repeated in the present embodiment.

(3) When the sum of the touch duration of the second touched position and the touch duration of the first touched position is greater than the preset first touch duration, the long-press identifier is updated. For example, the numerical value of the long-press identifier is updated from the initial value to the first numerical value. In the present embodiment, the first numerical value of the long-press identifier corresponds to the long-press operation. The touch operation is recognized as a long-press operation according to the long-press identifier as updated, and the touch response to the long-press operation is performed according to the long-press identifier.

Taking the touched positions of the touched surface as shown in FIG. 2 as an example, if the first touched position is pad1, when pad2 is continuously touched, the forward-slide identifier is updated to 1. When the sum of the duration for which pad2 is continuously touched and the duration for which pad1 is continuously touched is greater than a preset first duration, for example, greater than 30 ms, the long-press identifier is updated to 1. At this point, the touch operation is recognized as a long-press operation.

In the present embodiment, when the continuous-touch condition of the first touched position is that the second touched position adjacent to the first touched position is continuously touched (that is, the touch operation slides from the first touched position to the second touched position on the touched surface), if at this point the sum of the touch duration of the first touched position and the touch duration of the second touched position is greater than the preset first touch duration, the touch operation is recognized as a long-press operation, and is not recognized as a forward-slide operation. In other words, in practical use, if there is sliding back and forth between adjacent positions on the touched surface, if the sliding duration is greater than the preset first touch duration (for example, greater than 30 ms), in the present embodiment, the touch operation is recognized as a long-press operation, and is not recognized as a misoperation.

(4) If there is not a touched position on the touched surface that is continuously touched after the second touched position is touched, the touch-operation identifier is updated to be a single-click identifier and a double-click identifier, and the touch condition on the touched surface is acquired within a preset second touch duration. For example, if the single-click identifier is an initial value, the single-click identifier is updated to the first numerical value, and the double-click identifier is updated to the initial value, and if the single-click identifier is the first numerical value, the single-click identifier is updated to the initial value, and the double-click identifier is updated to the first numerical value.

If there is not a touched position that is touched on the touched surface within the preset second touch duration, the touch operation is recognized as a single-click operation or a double-click operation according to the single-click identifier and the double-click identifier as updated. If the single-click identifier as updated is the first numerical value and the double-click identifier as updated is the initial value, the touch operation is recognized as a single-click operation. Conversely, if the single-click identifier as updated is the initial value and the double-click identifier as updated is the first numerical value, the touch operation is recognized as a double-click operation. The touch response for the corresponding single-click or double-click operation is performed according to the single-click identifier and the double-click identifier.

If a third touched position adjacent to the second touched position on the touched surface is touched within the preset second touch duration, a continuous-touch condition of the third touched position is acquired, and a corresponding touch-operation identifier is updated according to the continuous-touch condition of the third touched position. Regarding the method of updating the single-click identifier and the double-click identifier, it may refer to the description above. The continuous-touch condition of the third touched position is the same as the continuous-touch condition of the second touched position described above, which will not be repeated in the present embodiment.

Taking the touched positions of the touched surface as shown in FIG. 2 as an example, if the first touched position is pad1, when pad2 is continuously touched, the forward-slide identifier is updated to 1. If after pad2 is continuously touched, no pad is touched (pad2 is not touched, either), the single-click identifier and the double-click identifier are updated, and if when the preset second touch duration is exceeded (for example, after 10 ms), there is still no pad touched on the touched surface, the touch operation is recognized as a single-click operation or a double-click operation according to the single-click identifier and the double-click identifier. If when the preset second touch duration has not been exceeded (for example, at an interval of 8 ms), pad3 or pad1 on the touched surface is touched, the continuous-touch condition of pad3 or pad1 is acquired, and the corresponding touch-operation identifier is updated according to the continuous-touch condition of pad3 or pad1.

In the present embodiment, that "there is no other touched position on the touched surface that is continuously touched within the preset second touch duration" may be understood as: after the second touched position on the touched surface is touched, within an interval of the preset second touch duration (for example, within an interval of 10 ms), no other touched position on the touched surface is touched. The preset second touch duration is the non-contact time period, and may be understood as the longest interval between two touches. If the interval is exceeded, it is considered that the touched surface has not been touched, and one touch operation ends.

That "a third touched position adjacent to the second touched position on the touched surface is touched within the preset second touch duration" may be understood as: after the second touched position on the touched surface is touched, after an interval of a preset third touch duration which is less than the preset second touch duration (for example, after an interval of 8 ms), the third touched position forwardly or backwardly adjacent to the second touched position on the touched surface is touched. At this point, after the touch operation is performed at the second touched position of the touched surface, it leaves the touched surface for a period of time (the period of time may also be understood as the interval between the touch duration of the second touched position and the touch duration of the third touched position, and the interval is less than the preset second touch duration), and then touches the third touched position of the touched surface.

In the present embodiment, the continuous-touch condition of the first touched position is that the second touched position forwardly adjacent to the first touched position is continuously touched. After the second touched position is continuously touched, an invalid contact occurs. According to the duration of the invalid contact, it is identified whether the touch operation is a single-click operation or a double-click operation. For example, if the duration of the invalid contact is short, and after the invalid contact, the third touched position forwardly adjacent to the second touched position on the touched surface is touched, the invalid contact is a misoperation. At this point the touch operation is recognized as a forward-slide operation. In the present embodiment, by identifying the duration of the invalid contact, the invalid contact can be recognized as an operation interval of a single-click or double-click operation or as a misoperation in a long-press operation or a slide operation, so that the touch operation can be accurately recognized when an invalid contact occurs in a long-press operation or a slide operation.

If the continuous-touch condition of the first touched position is the second continuous-touch condition, the present embodiment updates the touch-operation identifier by the following method:

when the touch duration of the first touched position is greater than the preset first touch duration, the long-press identifier is updated (for example, the long-press identifier is updated from the initial value to the first numerical value), the touch operation is recognized as a long-press operation according to the long-press identifier as updated, and the touch response to the long-press operation is performed according to the long-press identifier.

If the continuous-touch condition of the first touched position is the third continuous-touch condition, the present embodiment updates the touch-operation identifier by the following method:

when the third continuous-touch condition is that after the first touched position is touched, there is no other touched position on the touched surface that is continuously touched within a preset second touch duration, the single-click identifier and the double-click identifier are updated, the touch operation is recognized as a single-click operation or a double-click operation according to the single-click identifier and the double-click identifier as updated, and the touch response to the single-click operation or the double-click operation is performed according to the single-click identifier and the double-click identifier. If the single-click identifier is the initial value, the single-click identifier is updated to the first numerical value, and the double-click identifier is updated to the initial value; and if the single-click identifier is the first numerical value, the single-click identifier is updated to the initial value, and the double-click identifier is updated to the first numerical value. When the single-click identifier is the first numerical value and the double-click identifier is the initial value, the touch operation is recognized as a single single-click operation; and when the single-click identifier is the initial value and the double-click identifier is the first numerical value, the touch operation is recognized as a double-click operation.

When the third continuous-touch condition is that after the first touched position is touched, the second touched position adjacent to the first touched position on the touched surface is touched within the preset second touch duration, the single-click identifier and the double-click identifier are updated, the continuous-touch condition of the second touched position is acquired, and according to the continuous-touch condition of the second touched position, the corresponding touch-operation identifier is updated. Regarding "according to the continuous-touch condition of the second touched position, the corresponding touch-operation identifier is updated", it may refer to the description above, which will not be repeated in the present embodiment.

In the embodiments of the present disclosure, by detecting the continuous actions of the user on the touched surface, updating various types of touch-operation identifiers according to the touch information (such as the position relation between the touched positions, the touch duration, and the touch interval), and recognizing touch operations according to the touch-operation identifiers as updated, the touch operations containing a misoperation (such as a long-press operation containing a slide operation, a slide operation or a long-press operation containing a single-click or double-click operation, and a forward-slide operation containing a backward-slide operation) can be accurately recognized.

In order to describe in detail the method for recognizing a touch operation on a touched surface according to an embodiment of the present disclosure, a state machine may be used to record the process of the state transition of a touched position, and the touch operation may be recognized according to the process of the state transition of the touched position. For the convenience of description, the process of the state transition of the pads is described below by taking the pad distribution in FIG. 2 as an example.

Figure 3:
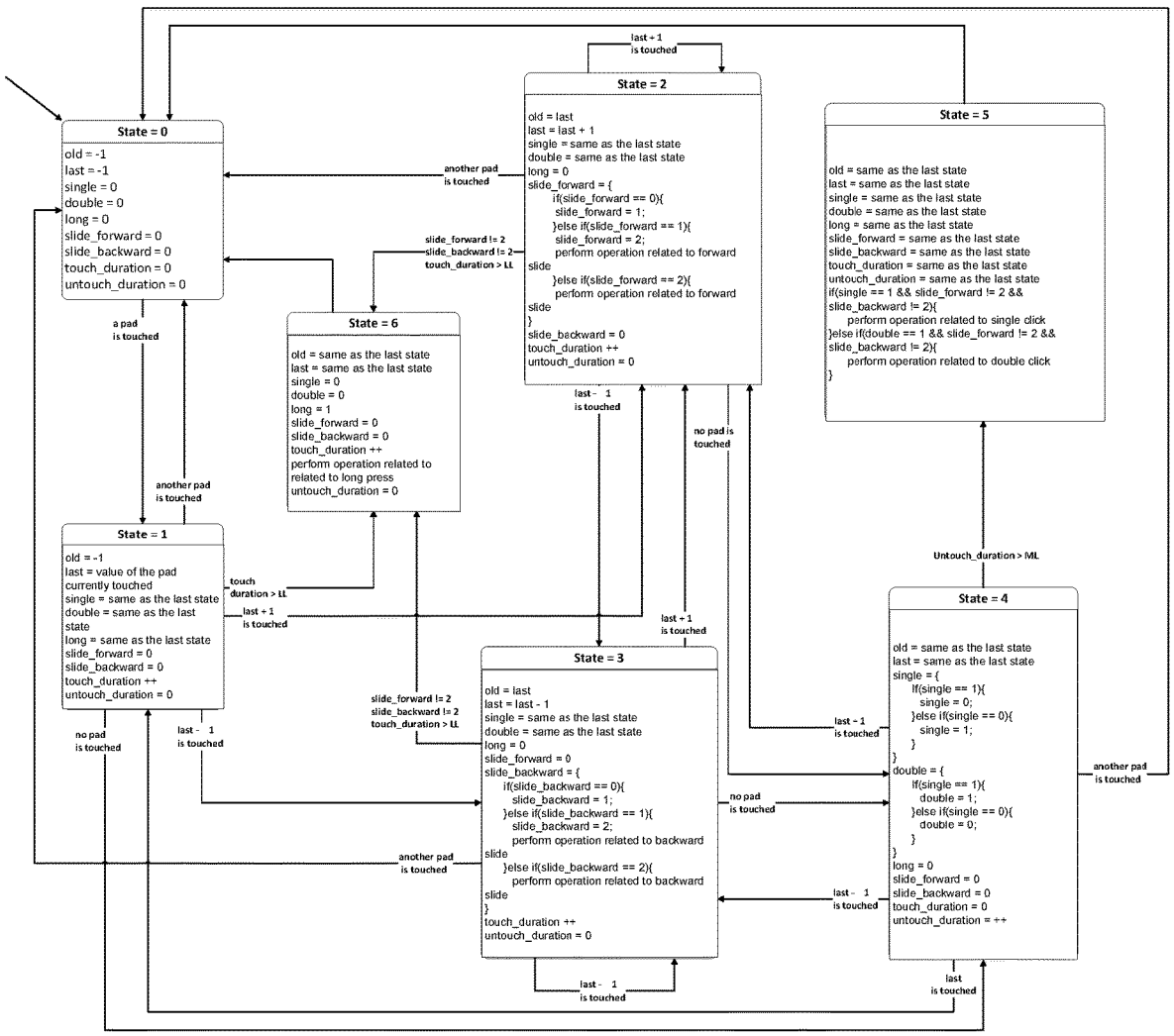
FIG. 3 is a diagram of a state machine transition according to an embodiment of the present disclosure.

FIG. 3 is a diagram of a state machine transition according to an embodiment of the present disclosure. As shown in FIG. 3, the state machine according to the present embodiment involves twelve parameters, including ten variables and two constants. In FIG. 3, the variable "last" denotes the identifier of the pad that was touched last time;

the variable "old" denotes the identifier of the pad that was touched for the previous time; as an example, the initial values of last and old are both 0, and can take values between 1 and 8, which correspond to the pads in FIG. 2, respectively;

the variable "single" denotes the single-click identifier, which identifies the occurrence of a single-click event;

the variable "double" denotes the double-click identifier, which identifies the occurrence of a double-click event;

the variable "long" denotes the long-press identifier, which identifies the occurrence of a long-press event; as an example, the initial values of single, double, and long are 0, and their first numerical values are 1;

the variable "slide_forward" denotes the forward-slide identifier, indicating clockwise slide;

the variable "slide_backward" denotes the backward-slide identifier, indicating counterclockwise slide; as an example, the initial values of slide_forward and slide_backward are 0, which means that there is no slide operation, their first numerical values are 1, which means that there may probably be a slide operation, and their second numerical values are 2, which means that there is a slide operation for sure;

the variable "touch duration" denotes the touch duration, which records the duration for which that the pad is continuously touched;

the variable "untouc_duration" denotes the interval, which records the untouched time from the end of a certain pad touch to the start of the next pad touch;

the variable "state" denotes the state value, which identifies the current state.

the constant "LL" denotes the preset first touch duration, wherein if the touch duration exceeds this value, the touch operation is determined as a long-press operation; and the constant "ML" denotes the preset second touch duration, which is the longest interval between two touches, wherein if the length of time within which no pad is touched exceeds this value, it is determined that one operation is over.

In the present embodiment, in a polling manner, it is read from the touch-sensor module at a preset interval (for example, 5 ms) whether there is a pad being touched currently, and then the state of the state machine is updated. The preset first touch duration LL and the preset second touch duration ML according to the present embodiment are both greater than the above interval for polling.

Referring to FIG. 3, when no pad is touched, the state machine is always in the state state=0. When there is a pad being touched, the state machine enters the state state=1. At this point, the variable last is updated to the identifier of the pad currently touched. The variable touch duration continues to increase, and the values of other variables remain the same as the last state. For ease of description, it is assumed that the pad touched at this point is pad1, and the subsequent process of the state transition is described based on this assumption, wherein last+1 and last−1 in FIG. 3 refer to the next pad in clockwise and counterclockwise directions, respectively.

After entering into the state state=1, it is continued to be read from the touch-sensor module at the interval (for example, 5 ms) whether there is a pad being touched currently. As shown in FIG. 3, the state can enter into state=0, state=2, state=3, state=4, and state=6 from state 1.

Entering into state=0 from state=1 is: when it is read from the touch-sensor module that another pad not adjacent to pad1 is touched (for example, after pad1 is touched, pad3 is touched), the state enters into state=0, the touch operation is determined as a misoperation, and the touch operation is not responded to.

Entering into state=4 from state=1 is: when it is read from the touch-sensor module that after pad1 is touched, no other pad is continuously touched, the state enters into state=4. At this point, according to the method described above, the variables single and double are updated, the variable touch duration is initialized, and the variable untouc_duration continues to increase. When untouc_duration is greater than ML, the state enters into state=5 from state=4. At this point, all variables of state=5 are the same as those of the last state. When single=1, slide_forward!=2, and slide_backward!=2, a single-click operation is performed. When double=1, slide_ forward!=2, and slide_backward!=2, a double-click operation is performed. After the single-click or double-click operation is completed, the state returns to state=0 to initialize all of the variables.

When untouc_duration is not greater than ML, it is read from the touch-sensor module whether there is another pad being touched. If pad2 in the clockwise direction of pad1 is continuously touched, the state enters into state=2. At this point the variables old=last, and last=last+1, i.e., old=pad1, and last=pad2. According to the method described above, the variable slide_forward is updated. That is, the forward-slide operation is performed when the updated slide_forward=2. After the completion of the forward-slide operation the state returns to state=0 to initialize all of the variables. When the updated slide_forward=1, it is continued to be read from the touch-sensor module whether there is another pad being touched. If pad3 in the clockwise position of pad2 is continuously touched, the variable slide_forward is updated to slide_forward=2 and the forward-slide operation is performed. If there is not another pad being touched, the state enters into state=4. If pad1 in the counterclockwise position of pad2 is continuously touched, the state enters into state=3. If pad2 is continuously touched and the variable touch duration is greater than LL, the state enters into state=6. If another pad which is not adjacent to pad2 is touched, the state enters into state=0. If pad8 in the counterclockwise direction of pad1 is continuously touched, the state enters into state=3. At this point the variables old=last, and last=last+1, i.e., old=pad1, and last=pad8. According to the method described above, the variable slide_backward is updated. Particularly, the backward-slide operation is performed when the updated slide_backward=2. After the completion of the backward-slide operation the state returns to state=0 to initialize all of the variables. When the updated slide_backward=1, it is continued to be read from the touch-sensor module whether there is another pad being touched. If pad7 in the counterclockwise position of pad8 is continuously touched, the variable slide_backward is updated to slide_backward=2 and the backward-slide operation is performed. If there is not another pad being touched, the state enters into state=4. If pad1 in the clockwise position of pad8 is continuously touched, the state enters into state=2. If pad8 is continuously touched and the variable touch duration is greater than LL, the state enters into state=6. If another pad which is not adjacent to pad8 is touched, the state enters into state=0.

After jumping from state=0 to state=1, if it is detected that no pad is touched, the state machine jumps from state=1 to state=4, and the variable untouc_duration starts to accumulate. If before the numerical value of untouc_duration reaches ML, the last+/pad is touched, the state machine jumps from state=4 to state=2, and then it is decided whether to perform the slide operation according to the slide_forward or slide_backward identifier. According to the embodiments of the present disclosure, the recognition method can effectively avoid the touch interruption caused by the large physical interval between the pads or the sliding due to the poor quality of the touch-sensor module, and avoid the misjudgment caused by the fact that no pad is touched.

Entering into state=6 from state=1 is: when it is read from the touch-sensor module that pad1 is continuously touched, and the variable touch duration is greater than LL, the state enters into state=6. At this point, the variable long is updated to long=1, a long-press operation is performed. After the completion of the long-press operation the state returns to state=0 to initialize all of the variables.

Entering into state=2 from state=1 is: when it is read from the touch-sensor module that after pad1 is touched, pad2 in the clockwise position of pad1 is continuously touched, the state enters into state=2. At this point the variables old=last, and last=last+1, i.e., old=pad1, and last=pad2. According to the method described above, the variable slide_forward is updated. The forward-slide operation is performed when the updated slide_forward=2. After the completion of the forward-slide operation the state returns to state=0 to initialize all of the variables. When the updated slide_forward=1, it is continued to be read from the touch-sensor module whether there is another pad being continuously touched. If pad3 in the clockwise position of pad2 is continuously touched, the variable slide_forward is updated to slide_forward=2 and the forward-slide operation is performed. If there is not another pad being touched, the state enters into state=4. If pad1 in the counterclockwise position of pad2 is continuously touched, the state enters into state=3. If pad2 is continuously touched and the variable touch duration is greater than LL, the state enters into state=6. If another pad which is not adjacent to pad2 is touched, the state enters into state=0.

In the present embodiment, when jumping from state=1 to state=2, the slide operation is not processed immediately, but the numerical value of the slide_forward identifier is set to 1. When it is detected that the next pad whose pad identifier is last+1 is touched, the numerical value of the slide_forward identifier is set to 2, and till this point it is determined to be a forward-slide operation. In the present embodiment, by combining the state switching among state=2, state=3, state=4, and state=6, the following case can be effectively avoided: it is erroneously recognized as a slide operation due to the touching between two pads and the jumping of the result read from the touch sensor between the two pads.

After jumping from state=1 to state=2, if no clockwise slide operation is detected, but it is detected that the pad identified as last is touched all the time or the touch jumps back and forth between last+1 and last (that is, between state=2 and state=3), the variable touch duration will continue accumulating. When the numerical value of touch duration is greater than LL, the state machine jumps to state=6, and the touch operation is recognized as a long-press operation. Such a method for recognizing a long-press operation avoids the problem that a long press cannot be triggered because the result read from the touch sensor jumps between the two pads, which is caused by touching the area between the two pads.

Entering into state=3 from state=1 is: when it is read from the touch-sensor module that after pad1 is touched, pad8 in the counterclockwise position of pad1 is continuously touched, the state enters into state=3. At this point the variables old=last, and last=last−1, i.e., old=pad1, and last=pad8. According to the method described above, the variable slide_backward is updated. The backward-slide operation is performed when the updated slide_backward=2. After the completion of the backward-slide operation the state returns to state=0 to initialize all of the variables. When the updated slide_backward=1, it is continued to be read from the touch-sensor module whether there is another pad being touched. If pad7 in the counterclockwise position of pad8 is continuously touched, the variable slide_backward is updated to slide_backward=2 and the backward-slide operation is performed. If there is not another pad being touched, the state enters into state=4. If pad1 in the clockwise position of pad8 is continuously touched, the state enters into state=2. If pad8 is continuously touched and the variable touch duration is greater than LL, the state enters into state=6. If another pad which is not adjacent to pad8 is touched, the state enters into state=0.

Correspondingly to the method for touch recognition according to the embodiments of the present disclosure, according to the embodiments of the present disclosure, another aspect of the present disclosure further provides a device for touch recognition.

Figure 4:
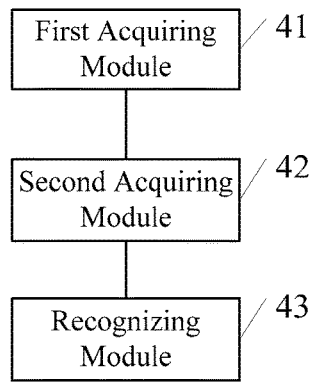
FIG. 4 is a schematic diagram of the structure of a device for touch recognition according to an embodiment of the present disclosure.

FIG. 4 is a schematic diagram of the structure of a device for touch recognition according to an embodiment of the present disclosure. As shown in FIG. 4, the device according to the present embodiment comprises:

a first acquiring module 41, for acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;

a second acquiring module 42, for acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and a recognizing module 43, for updating a corresponding touch-operation identifier according to the continuous-touch condition of the first touched position to recognize the touch operation, and performing a touch response to a corresponding touch operation according to the touch-operation identifier as updated.

According to an embodiment of the present disclosure, the slide identifier includes a forward-slide identifier and a backward-slide identifier, and the first continuous-touch condition includes a condition in which a second touched position forwardly adjacent to the first touched position is continuously touched.

The first acquiring module 41 is further for, when the second touched position forwardly adjacent to the first touched position is continuously touched, updating the forward-slide identifier, and acquiring touch information corresponding to the second touched position when the touch operation is performed at the second touched position on the touched surface. The second acquiring module 42 is further for acquiring a continuous-touch condition of the second touched position according to the touch information corresponding to the second touched position, wherein the continuous-touch condition of the second touched position includes a condition in which a third touched position forwardly adjacent to the second touched position is continuously touched, or a condition in which a fourth touched position backwardly adjacent to the second touched position is continuously touched, or a condition in which a sum of a touch duration of the second touched position and a touch duration of the first touched position is greater than a preset first touch duration, or a condition in which there is not a touched position on the touched surface that is continuously touched after the second touched position is touched. The recognizing module 43 comprises an updating module for, according to the continuous-touch condition of the second touched position, updating a corresponding touch-operation identifier.

The updating module is further for, when the third touched position forwardly adjacent to the second touched position is continuously touched, re-updating the forward-slide identifier. The recognizing module 43 is further for, according to the forward-slide identifier as re-updated, recognizing the touch operation as a forward-slide operation, and performing the touch response to the forward-slide operation according to the forward-slide identifier.

The updating module is further for, when the fourth touched position backwardly adjacent to the second touched position is continuously touched, updating the backward-slide identifier. The first acquiring module 41 is further for acquiring touch information corresponding to the fourth touched position when the touch operation is performed at the fourth touched position on the touched surface. The second acquiring module 42 is further for acquiring a continuous-touch condition of the fourth touched position according to the touch information corresponding to the fourth touched position. The updating module is further for, according to the continuous-touch condition of the fourth touched position, updating a corresponding touch-operation identifier.

The updating module is further for, if the sum of the touch duration of the second touched position and the touch duration of the first touched position is greater than the preset first touch duration, updating the touch-operation identifier to be a long-press identifier. The recognizing module 43 is further for, according to the long-press identifier as updated, recognizing the touch operation as a long-press operation, and performing the touch response to the long-press operation according to the long-press identifier.

The updating module is further for, if there is not a touched position on the touched surface that is continuously touched after the second touched position is touched, updating the single-click identifier and the double-click identifier. The first acquiring module 41 is further for acquiring a touch condition on the touched surface within a preset second touch duration. The recognizing module 43 is further for, if there is not a touched position that is touched on the touched surface within the preset second touch duration, according to the single-click identifier and the double-click identifier as updated, recognizing the touch operation as a single-click operation or a double-click operation, and according to the single-click identifier and the double-click identifier, performing the touch response to the corresponding single-click operation or double-click operation. The second acquiring module 42 is further for, if the third touched position adjacent to the second touched position on the touched surface is touched within the preset second touch duration, acquiring a continuous-touch condition of the third touched position. The updating module is further for, according to the continuous-touch condition of the third touched position, updating a corresponding touch-operation identifier.

According to another embodiment of the present disclosure, the recognizing module 43 is further for, if the continuous-touch condition of the first touched position is the second continuous-touch condition, updating the long-press identifier, according to the long-press identifier as updated, recognizing the touch operation as a long-press operation, and performing the touch response to the long-press operation according to the long-press identifier.

The recognizing module 43 is further for, if after the first touched position is touched, there is not a touched position on the touched surface that is continuously touched, updating the single-click identifier and the double-click identifier, and acquiring a touch condition on the touched surface within a preset second touch duration; if there is not a touched position that is touched on the touched surface within the preset second touch duration, according to the single-click identifier and the double-click identifier as updated, recognizing the touch operation as a single-click operation or a double-click operation, and according to the single-click identifier and the double-click identifier, performing the touch response to the corresponding single-click operation or double-click operation; and if the second touched position adjacent to the first touched position on the touched surface is touched within the preset second touch duration, the second acquiring module 42 acquiring a continuous-touch condition of the second touched position, and the recognizing module 43, according to the continuous-touch condition of the second touched position, updating a corresponding touch-operation identifier.

For the specific working modes of the units in the device embodiments of the present disclosure, it may refer to the method embodiment of the present disclosure, which will not be repeated herein.

Another aspect of the present disclosure further provides a system for touch recognition.

The system for touch recognition comprises: one or more storage units for storing executable instructions; and one or more processing units for executing the executable instructions to implement the method for touch recognition described above.

The present disclosure further provides a computer-readable storage medium. The computer-readable storage medium stores executable instructions. When the executable instructions are executed by a processor, the method for touch recognition described above can be implemented.

It should be noted that the computer-readable storage medium of the embodiment of the present disclosure may be, for example, any medium capable of containing, storing, transmitting, propagating, or transferring instructions. For example, the computer-readable storage medium may include, but is not limited to, electrical, magnetic, optical, electromagnetic, infrared, or semiconductor systems, apparatuses, devices, or propagation media. Specific examples of the computer-readable storage medium include: magnetic storage devices such as magnetic tapes or hard disk drives (HDD); optical storage devices such as optical disks (CD-ROM); memories such as random access memory (RAM) or flash memory; and/or wired/wireless communication links.

The readable storage medium may comprise a computer program, which may include codes or computer-executable instructions, when executed by a processor, causing the processor to execute, for example, the method flow described above and any variations thereof.

The computer program may be configured to include computer program codes, for example those containing computer program modules. For example, in an illustrative embodiment, the codes in a computer program may contain one or more program modules. It should be noted that the division manner and the number of modules are not fixed, and a person skilled in the art can use an appropriate program module or combination of program modules according to actual conditions. When the combination of program modules is executed by the processor, the processor can execute, for example, the method flow described above and any variations thereof.

The embodiments of the present disclosure acquire the continuous-touch condition of the first touched position based on the change of the touched position and the change of the touch duration on the touched surface, update the corresponding touch-operation identifier by using the continuous-touch condition of the first touched position, and recognize the touch operation on the touched surface by using the correspondence between the numerical value of the touch-operation identifier and the touch operation.

The present disclosure can recognize touch operations containing interference operations in the touch process caused by factors such as touching the boundary of adjacent touched positions, and back and forth sliding touch between adjacent touched positions. The examples of touch operations containing interference operations include: a long-press operation containing a slide operation, a slide operation or long-press operation containing a single-click or double-click operation, and a forward-slide operation containing a backward-slide operation. The present disclosure aims to solve those problems, and can effectively avoid the influence of interference operations, accurately recognize various touch operations of the user on the touched surface, and enhance the user experience.

In order to facilitate clearly describing the technical solutions of the embodiments of the present disclosure, in the embodiments of the present disclosure, the words "first", "second" and so on are used to distinguish the same or similar items having substantially the same functions and effects. A person skilled in the art should understand that the words "first", "second" and so on do not limit the quantity and the execution order.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for touch recognition, comprising:
    acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;
    acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and
    updating a corresponding touch-operation identifier according to the continuous-touch condition of the first touched position to recognize the touch operation, and performing a touch response to a corresponding touch operation according to the touch-operation identifier as updated, wherein the slide identifier includes a forward-slide identifier and a backward-slide identifier;

the first continuous-touch condition includes a condition in which a second touched position forwardly adjacent to the first touched position is continuously touched; and the step of updating the corresponding touch-operation identifier according to the continuous-touch condition of the first touched position comprises:

when the second touched position forwardly adjacent to the first touched position is continuously touched, updating the forward-slide identifier, and acquiring touch information corresponding to the second touched position when the touch operation is performed at the second touched position on the touched surface;

acquiring a continuous-touch condition of the second touched position according to the touch information corresponding to the second touched position, wherein the continuous-touch condition of the second touched position includes a condition in which a third touched position forwardly adjacent to the second touched position is continuously touched, or a condition in which a fourth touched position backwardly adjacent to the second touched position is continuously touched, or a condition in which a sum of a touch duration of the second touched position and a touch duration of the first touched position is greater than a preset first touch duration, or a condition in which there is not a touched position on the touched surface that is continuously touched after the second touched position is touched; and updating a corresponding touch-operation identifier according to the continuous-touch condition of the second touched position.

2. The method according to claim 1, wherein the step of updating the corresponding touch-operation identifier according to the continuous-touch condition of the second touched position comprises:

when the third touched position forwardly adjacent to the second touched position is continuously touched, re-updating the forward-slide identifier; and recognizing the touch operation as a forward-slide operation according to the forward-slide identifier as re-updated.

3. The method according to claim 1, wherein the step of updating the corresponding touch-operation identifier according to the continuous-touch condition of the second touched position comprises:

when the fourth touched position backwardly adjacent to the second touched position is continuously touched, updating the backward-slide identifier, and acquiring touch information corresponding to the fourth touched position when the touch operation is performed at the fourth touched position on the touched surface;

acquiring a continuous-touch condition of the fourth touched position according to the touch information corresponding to the fourth touched position; and updating a corresponding touch-operation identifier according to the continuous-touch condition of the fourth touched position.

4. The method according to claim 1, wherein the step of updating the corresponding touch-operation identifier according to the continuous-touch condition of the second touched position comprises:

if the sum of the touch duration of the second touched position and the touch duration of the first touched position is greater than the preset first touch duration, updating the touch-operation identifier to be a long-press identifier; and recognizing the touch operation as a long-press operation according to the long-press identifier as updated.

5. The method according to claim 1, wherein the step of updating the corresponding touch-operation identifier according to the continuous-touch condition of the second touched position comprises:

if there is not a touched position on the touched surface that is continuously touched after the second touched position is touched, updating the touch-operation identifier to be a single-click identifier and a double-click identifier, and acquiring a touch condition on the touched surface within a preset second touch duration;

if there is not a touched position that is touched on the touched surface within the preset second touch duration, recognizing the touch operation as a single-click operation or a double-click operation according to the single-click identifier and the double-click identifier as updated; and if the third touched position adjacent to the second touched position on the touched surface is touched within the preset second touch duration, acquiring a continuous-touch condition of the third touched position, and updating a corresponding touch-operation identifier according to the continuous-touch condition of the third touched position.

6. The method according to claim 1, wherein the step of updating the corresponding touch-operation identifier according to the continuous-touch condition of the first touched position comprises:

if the continuous-touch condition of the first touched position is the second continuous-touch condition, updating the touch-operation identifier to be a long-press identifier; and recognizing the touch operation as a long-press operation according to the long-press identifier as updated.

7. The method according to claim 1, wherein the step of updating the corresponding touch-operation identifier according to the continuous-touch condition of the first touched position comprises:

if the continuous-touch condition of the first touched position is the third continuous-touch condition, updating the touch-operation identifier to be a single-click identifier and a double-click identifier, and acquiring a touch condition on the touched surface within a preset second touch duration;

if there is not a touched position that is touched on the touched surface within the preset second touch duration, recognizing the touch operation as a single-click operation or a double-click operation according to the single-click identifier and the double-click identifier as updated; and if the second touched position adjacent to the first touched position on the touched surface is touched within the preset second touch duration, acquiring a continuous-touch condition of the second touched position, and updating a corresponding touch-operation identifier according to the continuous-touch condition of the second touched position.

8. A device for touch recognition, comprising:
a first acquiring module, for acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;
a second acquiring module, for acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and
a recognizing module, for updating a corresponding touch-operation identifier according to the continuous-touch condition of the first touched position to recognize the touch operation, and performing a touch response to a corresponding touch operation according to the touch-operation identifier as updated, wherein
the slide identifier includes a forward-slide identifier and a backward-slide identifier;
the first continuous-touch condition includes a condition in which a second touched position forwardly adjacent to the first touched position is continuously touched;
the first acquiring module is further for, when the second touched position forwardly adjacent to the first touched position is continuously touched, updating the forward-slide identifier, and acquiring touch information corresponding to the second touched position when the touch operation is performed at the second touched position on the touched surface;
the second acquiring module is further for acquiring a continuous-touch condition of the second touched position according to the touch information corresponding to the second touched position, wherein the continuous-touch condition of the second touched position includes a condition in which a third touched position forwardly adjacent to the second touched position is continuously touched, or a condition in which a fourth touched position backwardly adjacent to the second touched position is continuously touched, or a condition in which a sum of a touch duration of the second touched position and a touch duration of the first touched position is greater than a preset first touch duration, or a condition in which there is not a touched position on the touched surface that is continuously touched after the second touched position is touched; and
the recognizing module comprises an updating module for updating a corresponding touch-operation identifier according to the continuous-touch condition of the second touched position.

9. The device according to claim 1, wherein the updating module is particularly for:
when the third touched position forwardly adjacent to the second touched position is continuously touched, re-updating the forward-slide identifier; and recognizing the touch operation as a forward-slide operation according to the forward-slide identifier as re-updated;
or
when the fourth touched position backwardly adjacent to the second touched position is continuously touched, updating the backward-slide identifier, and acquiring touch information corresponding to the fourth touched position when the touch operation is performed at the fourth touched position on the touched surface; acquiring a continuous-touch condition of the fourth touched position according to the touch information corresponding to the fourth touched position; and updating a corresponding touch-operation identifier according to the continuous-touch condition of the fourth touched position;
or
if the sum of the touch duration of the second touched position and the touch duration of the first touched position is greater than the preset first touch duration, updating the touch-operation identifier to be a long-press identifier, and recognizing the touch operation as a long-press operation according to the long-press identifier as updated;
or
if there is not a touched position on the touched surface that is continuously touched after the second touched position is touched, updating the touch-operation identifier to be a single-click identifier and a double-click identifier, and acquiring a touch condition on the touched surface within a preset second touch duration; if there is not a touched position that is touched on the touched surface within the preset second touch duration, recognizing the touch operation as a single-click operation or a double-click operation according to the single-click identifier and the double-click identifier as updated; and if the third touched position adjacent to the second touched position on the touched surface is touched within the preset second touch duration, acquiring a continuous-touch condition of the third touched position, and updating a corresponding touch-operation identifier according to the continuous-touch condition of the third touched position.

10. The device according to claim 8, wherein the recognizing module is further for:
if the continuous-touch condition of the first touched position is the second continuous-touch condition, updating the touch-operation identifier to be a long-press identifier, and recognizing the touch operation as a long-press operation according to the long-press identifier as updated.

11. The device according to claim 8, wherein the recognizing module is further for:
if the continuous-touch condition of the first touched position is the third continuous-touch condition, updating the touch-operation identifier to be a single-click identifier and a double-click identifier, and acquiring a touch condition on the touched surface within a preset second touch duration;
if there is not a touched position that is touched on the touched surface within the preset second touch duration, recognizing the touch operation as a single-click operation or a double-click operation according to the single-click identifier and the double-click identifier as updated; and
if the second touched position adjacent to the first touched position on the touched surface is touched within the preset second touch duration, acquiring a continuous-touch condition of the second touched position, and updating a corresponding touch-operation identifier according to the continuous-touch condition of the second touched position.

12. A system for touch recognition, comprising:
one or more processors;
memory; and
one or more programs, wherein the one or more programs are stored in the memory and configured to be executed by the one or more processors, the one or more programs including instructions for:
acquiring touch information corresponding to a first touched position on a touched surface when a touch operation is performed at the first touched position, wherein the touch information includes a touched-position identifier, a touch duration, and a touch-operation identifier, and the touch-operation identifier includes a long-press identifier, a single-click identifier, a double-click identifier, and a slide identifier;
acquiring a continuous-touch condition of the first touched position according to the touch information corresponding to the first touched position, wherein the continuous-touch condition includes: a first continuous-touch condition in which a second touched position adjacent to the first touched position is continuously touched, or a second continuous-touch condition in which the touch duration of the first touched position is greater than a preset first touch duration, or a third continuous-touch condition in which there is not a touched position on the touched surface that is continuously touched after the first touched position is touched; and
updating a corresponding touch-operation identifier according to the continuous-touch condition of the first touched position to recognize the touch operation, and performing a touch response to a corresponding touch operation according to the touch-operation identifier as updated, wherein
the slide identifier includes a forward-slide identifier and a backward-slide identifier;
the first continuous-touch condition includes a condition in which a second touched position forwardly adjacent to the first touched position is continuously touched; and
the step of updating the corresponding touch-operation identifier according to the continuous-touch condition of the first touched position comprises:
when the second touched position forwardly adjacent to the first touched position is continuously touched, updating the forward-slide identifier, and acquiring touch information corresponding to the second touched position when the touch operation is performed at the second touched position on the touched surface;
acquiring a continuous-touch condition of the second touched position according to the touch information corresponding to the second touched position, wherein the continuous-touch condition of the second touched position includes a condition in which a third touched position forwardly adjacent to the second touched position is continuously touched, or a condition in which a fourth touched position backwardly adjacent to the second touched position is continuously touched, or a condition in which a sum of a touch duration of the second touched position and a touch duration of the first touched position is greater than a preset first touch duration, or a condition in which there is not a touched position on the touched surface that is continuously touched after the second touched position is touched; and
updating a corresponding touch-operation identifier according to the continuous-touch condition of the second touched position.

13. The system according to claim 12, wherein the step of updating the corresponding touch-operation identifier according to the continuous-touch condition of the second touched position comprises:
when the third touched position forwardly adjacent to the second touched position is continuously touched, re-updating the forward-slide identifier; and recognizing the touch operation as a forward-slide operation according to the forward-slide identifier as re-updated;
or
when the fourth touched position backwardly adjacent to the second touched position is continuously touched, updating the backward-slide identifier, and acquiring touch information corresponding to the fourth touched position when the touch operation is performed at the fourth touched position on the touched surface; acquiring a continuous-touch condition of the fourth touched position according to the touch information corresponding to the fourth touched position; and updating a corresponding touch-operation identifier according to the continuous-touch condition of the fourth touched position;
or
if the sum of the touch duration of the second touched position and the touch duration of the first touched position is greater than the preset first touch duration, updating the touch-operation identifier to be a long-press identifier, and recognizing the touch operation as a long-press operation according to the long-press identifier as updated;
or
if there is not a touched position on the touched surface that is continuously touched after the second touched position is touched, updating the touch-operation identifier to be a single-click identifier and a double-click identifier, and acquiring a touch condition on the touched surface within a preset second touch duration; if there is not a touched position that is touched on the touched surface within the preset second touch duration, recognizing the touch operation as a single-click operation or a double-click operation according to the single-click identifier and the double-click identifier as updated; and if the third touched position adjacent to the second touched position on the touched surface is touched within the preset second touch duration, acquiring a continuous-touch condition of the third touched position, and updating a corresponding touch-operation identifier according to the continuous-touch condition of the third touched position.

14. The system according to claim 12, wherein the step of updating the corresponding touch-operation identifier according to the continuous-touch condition of the first touched position comprises:
if the continuous-touch condition of the first touched position is the second continuous-touch condition, updating the touch-operation identifier to be a long-press identifier; and
recognizing the touch operation as a long-press operation according to the long-press identifier as updated.

15. The system according to claim 12, wherein the step of updating the corresponding touch-operation identifier according to the continuous-touch condition of the first touched position comprises:
- if the continuous-touch condition of the first touched position is the third continuous-touch condition, updating the touch-operation identifier to be a single-click identifier and a double-click identifier, and acquiring a touch condition on the touched surface within a preset second touch duration;
- if there is not a touched position that is touched on the touched surface within the preset second touch duration, recognizing the touch operation as a single-click operation or a double-click operation according to the single-click identifier and the double-click identifier as updated; and
- if the second touched position adjacent to the first touched position on the touched surface is touched within the preset second touch duration, acquiring a continuous-touch condition of the second touched position, and updating a corresponding touch-operation identifier according to the continuous-touch condition of the second touched position.

\* \* \* \* \*